(12) United States Patent
Mei

(10) Patent No.: US 11,055,482 B2
(45) Date of Patent: *Jul. 6, 2021

(54) FORM INPUT PROCESSING

(71) Applicant: Advanced New Technologies Co., Ltd., Grand Cayman (KY)

(72) Inventor: Yanfang Mei, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,160

(22) Filed: Oct. 14, 2019

(65) Prior Publication Data

US 2020/0042586 A1 Feb. 6, 2020

Related U.S. Application Data

(63) Continuation of application No. 14/446,263, filed on Jul. 29, 2014, now Pat. No. 10,445,418.

(30) Foreign Application Priority Data

Jul. 30, 2013 (CN) .......................... 201310326008.2

(51) Int. Cl.
  *G06F 17/00* (2019.01)
  *G06F 40/174* (2020.01)
  *G06F 3/0488* (2013.01)

(52) U.S. Cl.
  CPC ........ *G06F 40/174* (2020.01); *G06F 3/04886* (2013.01)

(58) Field of Classification Search
  None
  See application file for complete search history.

(56) References Cited

U.S. PATENT DOCUMENTS 6,141,018 A 10/2000 Beri et al.
6,577,296 B2 6/2003 Flack
(Continued)

FOREIGN PATENT DOCUMENTS

CN 1206887 A 2/1999
CN 101794195 A 8/2010
(Continued)

OTHER PUBLICATIONS

Wendworth et al, "How to Think Like a Computer Scientist: Learning with Python 3 Documentation", Aug. 2012, 3rd edition, total pages 75, URL<https://www.ict.ru.ac.za/Resources/cspw/Thinkcspy3/thinkcspy3.pdf> (Year: 2012).*

(Continued)

*Primary Examiner* — Mustafa A Amin
(74) *Attorney, Agent, or Firm* — Lee & Hayes, P.C.

(57) ABSTRACT

The present disclosure provides a form processing method and terminal. Instead of using the cursor to locate an input box at a form, the present techniques fix a position of the cursor at the form and move the form at a touchscreen to coincide an information inputting position at a to-be-processed input box with the position of the cursor at the touchscreen. The present techniques facilitate a terminal to input the information received from the user into the to-be-processed input box to achieve the purpose of using the form to collect information. The present techniques are not required to assign lots of processes for clicking by the user to trigger the touchscreen and moving the cursor and only need to assign processes of moving the form. Thus, the present techniques reduce the processes required for processing the form and effectively save terminal resources.

20 Claims, 8 Drawing Sheets

(56) References Cited

U.S. PATENT DOCUMENTS

| | | |
|---|---|---|
| 8,346,635 B1 | 1/2013 | Olim |
| 8,438,496 B1 | 5/2013 | Hegde |
| 2002/0057256 A1 | 5/2002 | Flack |
| 2002/0198935 A1 | 12/2002 | Crandall, Sr. et al. |
| 2006/0262102 A1 | 11/2006 | Lee |
| 2009/0249257 A1 | 10/2009 | Bove et al. |
| 2011/0252300 A1 | 10/2011 | Lloyd et al. |
| 2011/0314414 A1 | 12/2011 | Stringer et al. |
| 2012/0007802 A1 | 1/2012 | Doi |
| 2013/0074004 A1 | 3/2013 | Lau et al. |
| 2013/0187868 A1 | 7/2013 | Griffin et al. |
| 2013/0283195 A1 | 10/2013 | Bilgen et al. |
| 2013/0298072 A1 | 11/2013 | Lee et al. |
| 2013/0326428 A1 | 12/2013 | Liu |
| 2015/0039988 A1 | 2/2015 | Mei |

FOREIGN PATENT DOCUMENTS

| | | |
|---|---|---|
| CN | 102375667 A | 3/2012 |
| CN | 103076982 | 5/2013 |
| WO | WO201305528 A1 | 6/2013 |
| WO | WO2013085528 | 6/2013 |

OTHER PUBLICATIONS

The Korean Office Action dated Mar. 31, 2020 for Korean Patent Application No. 2016-7001789, a counterpart of U.S. Pat. No. 10,445,418, 9 pages.

The Chinese Office Action dated Jan. 18, 2017 for Chinese patent application No. 201310326008.2, a counterpart foreign application of U.S. Appl. No. 14/446,263, 14 pages.

Chinese Supplementary Search Report dated Jul. 11, 2017 for Chinese Patent Application No. 2013103260082, a counterpart foreign application of U.S. Appl. No. 14/446,263, 2 pages.

The Korean Office Action dated Jul. 22, 2019, for Korean Patent Application No. 2016-7001789, a counterpart foreign application of U.S. Appl. No. 14/446,263, 12 pages.

Office action for U.S. Appl. No. 14/446,263, dated Jan. 4, 2018, Mei, "Form Processing", 18 pages.

Office action for U.S. Appl. No. 14/446,263, dated Dec. 19, 2016, Mei, "Form Processing", 17 pages.

Office action for U.S. Appl. No. 14/446,263, dated Dec. 23, 2015, Mei, "Form Processing", 12 pages.

Office action for U.S. Appl. No. 14/446,263, dated Apr. 4, 2017, Mei, "Form Processing", 18 pages.

Office action for U.S. Appl. No. 14/446,263, dated Jun. 5, 2018, Mei, "Form Processing", 20 pages.

Office action for U.S. Appl. No. 14/446,263, dated Jun. 9, 2016, Mei, "Form Processing", 13 pages.

Office action for U.S. Appl. No. 14/446,263, dated Aug. 10, 2017, Mei, "Form Processing", 20 pages.

Office Action for U.S. Appl. No. 14/446,263, dated Sep. 19, 2018, Mei et al, "Form Processing", 23 pages.

PCT Search Report and Written Opinion dated Dec. 1, 2014 for PCT Application No. PCT/US14/48738, 8 Pages.

English-language translation of Second Office Action dated Aug. 1, 2017 by the State Intellectual Property Office of the People's Republic of China in corresponding Application No. 2013103260082 (20 pages).

Second Office Action dated Aug. 1, 2017 by the State Intellectual Property Office of the People's Republic of China in corresponding Application No. 2013103260082 (13 pages).

"Specifying the Input Method Type", retrieved on Nov. 21, 2014 at <<https://developer.android.com/training/keyboard-input/style.html>>, Android Developers, May 18, 2013, 2 pages.

English-language translation of Third Office Action issued by the State Intellectual Property Office of the People's Republic of China in corresponding Application No. 2013103260082 (20 pages).

Third Office Action issued by the State Intellectual Property Office of the People's Republic of China in corresponding Application No. 2013103260082 (12 pages).

Written Opinion dated May 28, 2020 by the Korean Patent Office in corresponding Application No. 20167001789 (6 pages).

English-language translation of the Written Opinion dated May 28, 2020 by the Korean Patent Office in corresponding Application No. 20167001789 (9 pages).

The Singaporean Office Action dated Aug. 13, 2020 for corresponding Singaporean Patent Application No. 10201800615R, a counterpart of U.S. Pat. No. 10,445,418 (9 pages).

The Singaporean Office Action dated Aug. 13, 2020 for Singaporean Patent Application No. 10201800615R, a counterpart of U.S. Pat. No. 10,445,418, 9 pages.

English-language translation of the Decision to Grant dated Oct. 26, 2020 by the Korean Patent Office in corresponding Application No. 20167001789 (2 pages).

* cited by examiner

FORM INPUT PROCESSING

CROSS REFERENCE TO RELATED PATENT APPLICATIONS

This application is a continuation of U.S. patent application Ser. No. 14/446,263, filed on Jul. 29, 2014, which claims foreign priority to Chinese Patent Application No. 201310326008.2 filed on 30 Jul. 2013, entitled "Form Processing Method and Terminal," which are hereby incorporated by reference in their entirety.

TECHNICAL FIELD

The present disclosure is related to the field of computer technology, and more particularly, to a method and a terminal for form processing.

BACKGROUND

With the development of terminal technology, terminals equipped with touchscreen as a basic input method are widely used as they are small and can be conveniently carried. Currently tablet personal computers (also referred to as tablet PC, flat PC, tablet, slate) and touchscreen cell phones promoted by various terminal manufacturers are typical terminals that use the touchscreen as the basic input method.

The touchscreen on the tablet is also referred to as a digital panel. A user does not need to use a traditional mouse and keyboard as an input device. Instead, the user can user his/her finger to directly operate the touchscreen. A purpose of inputting information to the table is achieved through a handwriting recognition software installed at the tablet or a soft keyboard displayed on the touchscreen.

Typical information inputting processes involve the tablet receiving information that the user inputs through a form displayed at the touchscreen. The form is an input page that is responsible for collecting data. The form has three basic components, i.e., a form tab, a form field, and a form button.

The form tab may include a URL of a CGI program that processes information collected by the form and a method that submits the information collected by the form to a server.

The form field may include at least one input box. The input box for data may be a text box, a password box, a hidden field, a multiple-line text box, a multiple-choice box, a single-choice box, a drop-down box, a file upload box, etc., to input collected information.

The form button may include a submission button, a reset button, and a general button to transmit the information collected by the form to a CGI script at the server or cancel the input. The form button may also be used to control other processing tasks that are defined by processing scripts.

FIG. 1 illustrates a form 102 and a soft keyboard 104 displayed at a touchscreen 106 of a tablet. A traditional form processing method is to use a cursor location method. A cursor 108 is used to locate an input box 110 that a user currently inputs information. The tablet receives the information that the user inputs through clicking the soft keyboard 104 at the touchscreen 106 into the input box 110 that is located by the cursor 108.

The cursor location method includes the following operations. After the user clicks and triggers the touchscreen, it is determined whether a position that the user clicks is the input box location of the form. If a determination result is positive, the cursor is moved to the information inputting position of the input box that the user clicks. The user clicks the soft keyboard at the touchscreen to input information into the input box located by the current cursor. The touchscreen is also ready to receive the information input by the user into the input box that the cursor locates.

In the example of the form 102 and the soft keyboard 104 in FIG. 1, after the touchscreen 106 detects that the user clicks a first line of the input box 110, the cursor 108 is moved to an information inputting position of the first line of the input box 110. The touchscreen 106 receives information input by the user, through clicking the soft keyboard 104, at the first line of the input box 110. After the information at the first line of the input box 110 completes inputting, the touchscreen 106 continues to detect whether the user clicks any other position of the input box 110. Assuming that the user clicks a second line of the input box 110, the touchscreen moves the cursor 108 to a position of the input box 110 that the user currently clicks, as shown in FIG. 2, to continue to receive information that the user inputs through the soft keyboard 104.

In the above form processing method based on the cursor location, the touchscreen needs to determine whether the user intends to input information into the input box in real time and which input box is triggered by the user's click. If a determination result is positive, the cursor is continuously moved to determine the input box that the user currently inputs the information. Thus, a large amount of processes are assigned to the touchscreen to implement the above input operations based on the cursor location, thereby occupying too many terminal resources and wasting terminal resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present techniques improve diversity of results in the direction technology.

The present disclosure provides an example form processing method. The example form processing method is applicable at a terminal with a touchscreen. The example method may include the following operations.

A to-be-processed input box at a form is determined. The form is moved at the touchscreen so that an information inputting position at the to-be-processed input box coincides with a position of a cursor at the touchscreen. Received information such as information received through a soft keyboard is input into the to-be-processed input box.

As the present techniques do not need to allocate a lot of processes to the touchscreen for a user's click to trigger and move the cursor, the present techniques only allocate the processes to operations for moving the form. Thus, the present techniques reduce the processes required for form processing and effectively save terminal resources.

For example, the position of the cursor at the touchscreen is a position with a preset distance to the soft keyboard and on top of the soft keyboard. As the cursor is fixed on top of the keyboard and at a position close to the soft keyboard, the present techniques enable the user to conveniently input information, fix the user's focus point, and improve accuracy and filling speed for filling the form.

For example, the operation of determining the to-be-processed input box may include the following. An input box into which information has not been input is determined as the to-be-processed input box. Another input box whose input information does not match a corresponding information attribute of the input box is determined as the to-be-processed input box. According to a sequence of determined to-be-processed input boxes in the form, such as from top to bottom and from left to right in a same line, the determined input inboxes are treated as the to-be-processed input box sequentially.

As the input box into which information has not been input and the input box whose input information does not match corresponding information attribute are treated as the to-be-processed input box, the incorrect input information may be detected at a terminal so that a user may be requested to re-input correct information and improve an efficiency of filing in the form.

For example, after the received information is input into the to-be-processed input box, the example method may also include the following operations. After information inputting operations with respect to all input boxes at the form have been finished, the form is displayed to the user. After a click or trigger with respect to a particular input box input through the touchscreen is received from the user, the form is moved so that the information inputting position at the particular input box that the user clicks coincides with the position of the cursor at the touchscreen. Information input by the user such as those through the soft keyboard is used to update the information that is already input into the input box where the cursor locates.

After the form has been filled-in, the information input into the input box may be modified according to the click or trigger of the user so that the incorrect input information may be detected at the terminal to improve an efficiency of filling in the form.

For another example, after the received information is input into the to-be-processed input box, the example method may also include the following operations. After information inputting operations with respect to all input boxes at the form have been finished, the form is submitted to a server. After the form with incorrect input information returned by the server is received, an information inputting position of an input box where the input information is incorrect coincides with the position of the cursor. Re-input information such as information received through the soft keyboard is input into the input box where the input information was incorrect to update the input information.

When the form that the terminal submits to the server includes the input box where the input information is incorrect, the terminal receives the form returned by the server and accurately coincides the input box where the input information is incorrect with the position of the cursor so that the user may conveniently modify the form and the efficiency of filling in the form is improved.

The present disclosure also provides an example terminal with a touchscreen. The apparatus may include a determining module, a form moving module, and an inputting module.

The determining module determines a to-be-processed input box at a form. The form moving module moves the form at the touchscreen so that an information inputting position at the to-be-processed input box coincides with a position of a cursor at the touchscreen.

The inputting module inputs received information such as information received through a soft keyboard into the to-be-processed input box.

As the present techniques do not need to allocate a lot of processes to the touchscreen for a user's click to trigger and move the cursor, the present techniques just allocate the processes to operations for moving the form. Thus, the present techniques reduce the processes required for form processing and effectively save terminal resources.

For example, the position of the cursor at the touchscreen is a position with a preset distance to the soft keyboard and on top of the soft keyboard. As the cursor is fixed on top of the keyboard and at a position close to the soft keyboard, the present techniques enable the user to conveniently input information and fix the user's focus point and improve accuracy and filling speed for filling in the form.

For example, the determining module may determine an input box into which information has not been input as the to-be-processed input box. The determining module may also determine another input box whose input information does not match corresponding information attribute of the input box as the to-be-processed input box. The determining module, according to a sequence of determined to-be-processed input boxes in the form, such as from top to bottom and from left to right in a same line, use the determined input inboxes as the to-be-processed input box sequentially.

As the input box into which information has not been input and the input box whose input information does not match corresponding information attribute are treated as the to-be-processed input box, the incorrect input information may be detected at a terminal so that a user may be requested to re-input correct information and improve an efficiency of filing in the form.

For example, the example apparatus may also include a displaying module that, after information inputting operations with respect to all input boxes at the form have been finished, displays the form to the user. The form moving module, when a click or trigger with respect to a particular input box input through the touchscreen is received from the user that is, moves the form so that the information inputting position at the particular input box that the user clicks coincides with the position of the cursor at the touchscreen.

The inputting module uses information input by the user such as those through the soft keyboard to update the information that is already input into the input box where the cursor locates.

After the form has been completely filled-in, the information input into the input box may be modified according to the click or trigger of the user so that the incorrect input information may be detected at the terminal to improve an efficiency of filling in the form.

For another example, the example apparatus may also include a submitting module that, after information inputting operations with respect to all input boxes at the form have been completed, submits the form to the server. The form moving module, after the form with incorrect input information returned by the server is received, coincides an information inputting position of an input box where the input information is incorrect with the position of the cursor. The inputting module uses re-input information such as information received through the soft keyboard to update the information that is already input into the input box where the input information is incorrect.

When the form that the terminal submits to the server includes the input box where the input information is incorrect, the terminal receives the form returned by the server and accurately matches the input box where the input information is incorrect with the position of the cursor so that the user may conveniently modify the form and the efficiency of filling in the form is improved.

BRIEF DESCRIPTION OF THE DRAWINGS

The FIGs in the present disclosure are briefly described below to better illustrate the present techniques. Apparently, the FIGs are just some example embodiments of the present disclosure. One of ordinary skill in the art may obtain other figures based on the FIGs below without using creative efforts.

DETAILED DESCRIPTION

Figure 1:
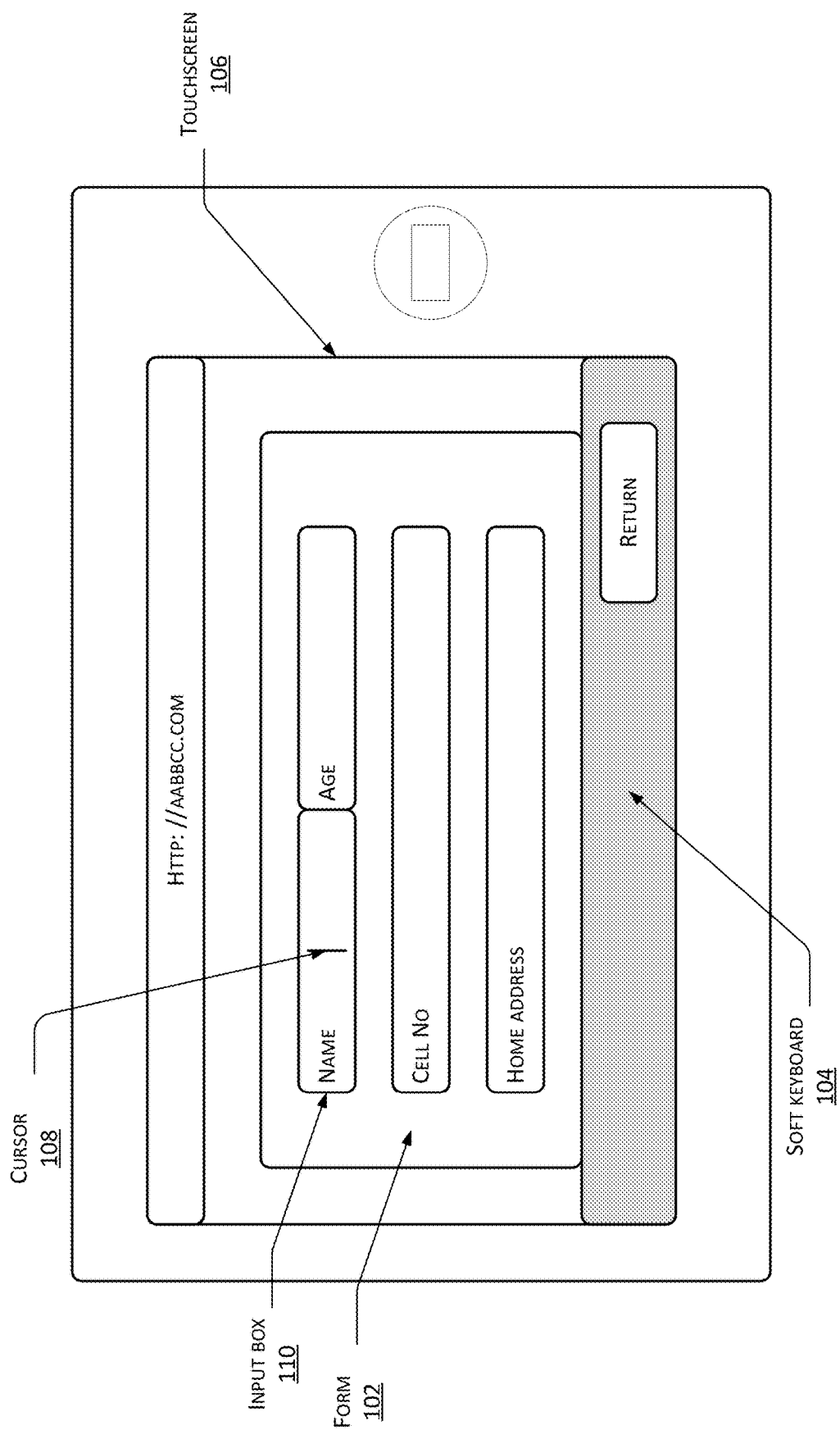
FIG. 1 is a diagram illustrating an example form and soft keyboard displayed at an example touchscreen according to cursor location methods under the background techniques.
Figure 2:
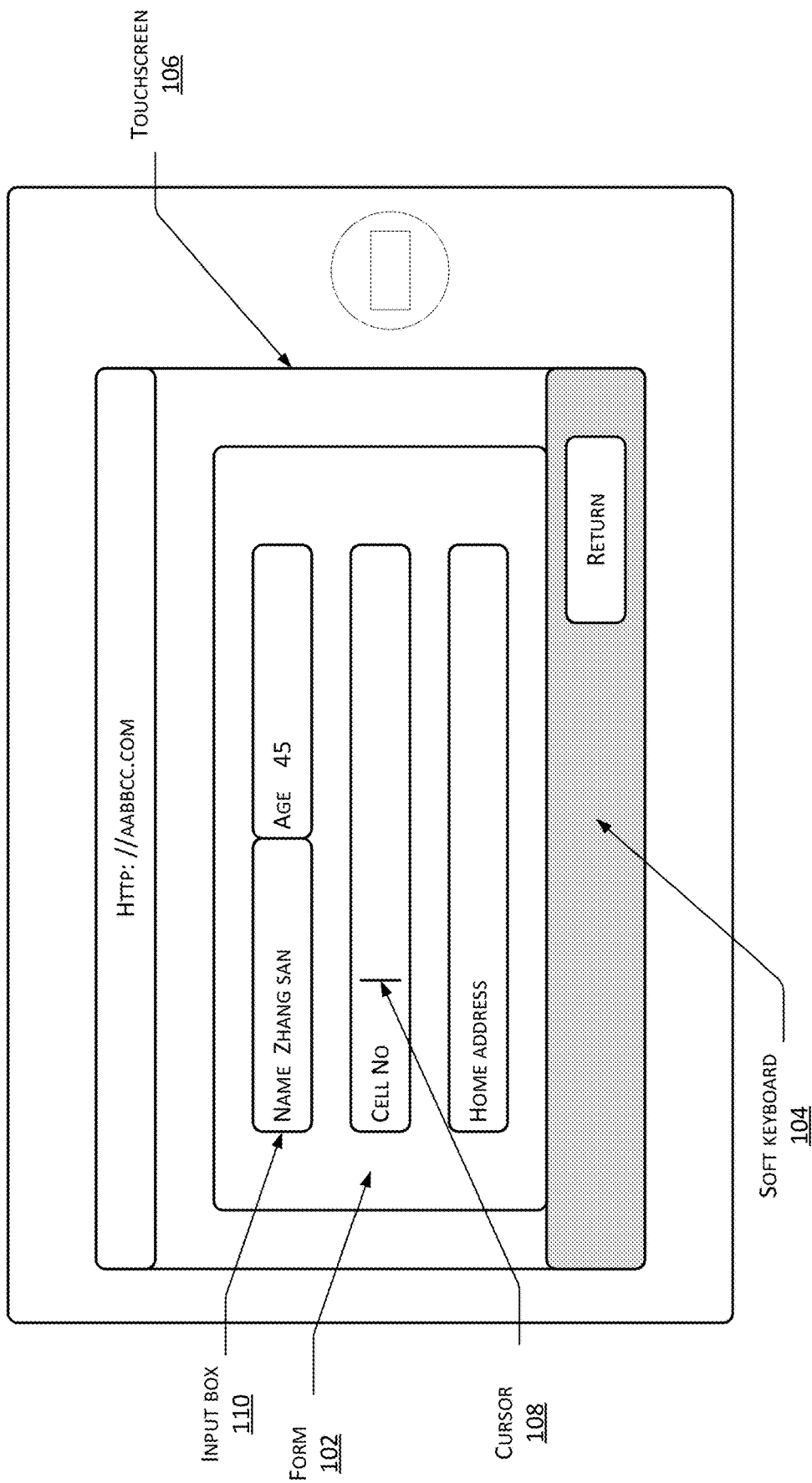
FIG. 2 is a diagram illustrating a moving of a cursor between input boxes according to the cursor location methods under the background techniques.

The following description describes the present disclosure with reference to the accompanied FIGs to clearly illustrate the purpose, technical plans, and advantages of the present disclosure. The described example embodiments are just a portion of embodiments instead of all embodiments of the present disclosure. Based on the example embodiments of the present disclosure, one of ordinary skill in the art may obtain other embodiments without using creative efforts, which are also under protection scope of the present disclosure.

In the form processing techniques of the present disclosure, a cursor is not used to locate an input box of a form. Instead, the present techniques fix a position of the cursor at a touchscreen, move the form at the touchscreen, and coincide an information inputting position of a to-be-processed input box with a position of the cursor so that a terminal may input information received from a user into the to-be-processed inbox to achieve the purpose of using the form to collect information. As the present techniques do not need to allocate a lot of processes to the touchscreen for a user's click to trigger and move the cursor, the present techniques only allocate the processes to operations for moving the form. Compared with the conventional techniques that use the cursor to locate the form, the present techniques reduce the processes required for form processing and effectively save terminal resources.

It is noted that the terminal as described in the present disclosure may be a terminal that uses the touchscreen as a basic input method. Examples of the terminal include a tablet and a touch-operate mobile phone. The terminal in the present disclosure, however, is not limited to the tablet and the touch-operated mobile phone.

The form, for example, may be an input page that is responsible for data collection at a webpage, such as a payment page at a shopping website, a website registration page, etc. The present disclosure does not limit a specific representation and an application scenario of the form.

The present techniques are described by reference to the FIGs below.

The following describes a first example embodiment of the present disclosure. Before an example form processing method of the first example embodiment is implemented, a terminal receives a trigger of a user through a touchscreen and conducts network business with a server. During a course of implementing the network business, after the terminal receives a form page pushed by the server, the terminal displays the received form to the user through the touchscreen. For example, there may be the following three methods to trigger the terminal to implement the example form processing method of the first example embodiment.

A first example method is a manual trigger by the user. After the terminal displays the received form to the user through the touchscreen, the terminal detects whether the form is triggered by a click of the user in real-time. If the terminal detects that the form is triggered by the click of the user and the terminal determines a position clicked by the user is a position of an input box of the form displayed at the touchscreen, the present techniques determine that the user intends to input information into the form. The terminal starts to implement the example form processing method of the first example embodiment of the present disclosure.

A second example method is a direct trigger. When the form displays the received form to the user at the touchscreen, the terminal directly starts to implement the example form processing method of the first example embodiment of the present disclosure.

A third example method is a direct trigger after a preset period of time. The terminal displays the received form to the user through the touchscreen and, after the preset period of time (such as three seconds) directly starts to implement the example form processing method of the first example embodiment of the present disclosure.

The trigger method of the first example embodiment of the present disclosure may use any of the above methods. The first example embodiment of the present disclosure may also use other methods. The present disclosure does not impose any restriction to the trigger method.

Figure 3:
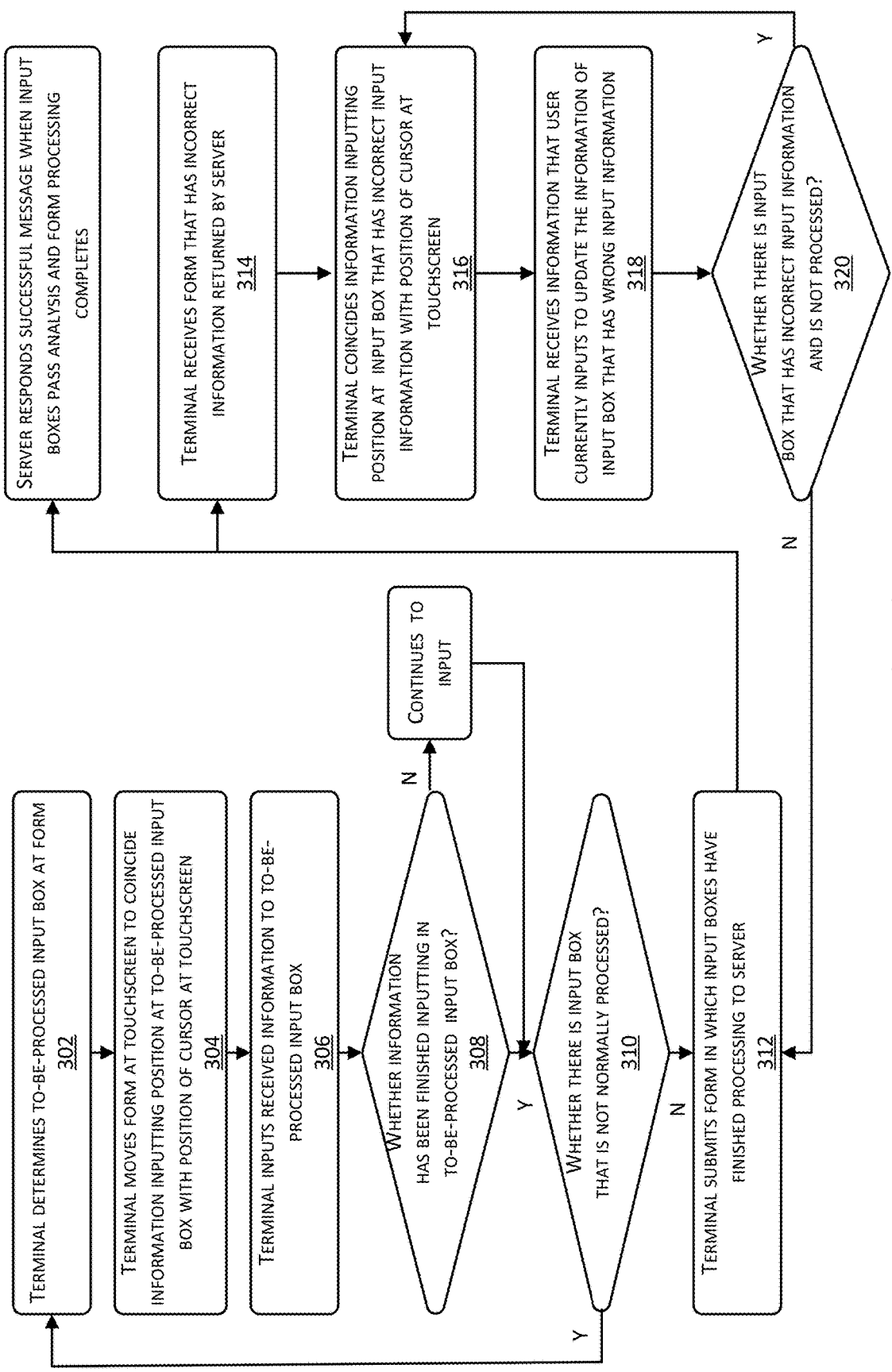
FIG. 3 is a flowchart illustrating an example form processing method according to a first example embodiment of the present disclosure.

FIG. 3 is a flowchart illustrating an example form processing method according to a first example embodiment of the present disclosure.

At 302, the terminal determines a to-be-processed input box at the form. For example, assuming that the terminal initially determines the to-be-processed input box at the form after the trigger, the to-be-processed input box is a first input box from top to bottom at the form. If there are multiple input boxes at a first line of the form, the to-be-processed input box at 302 is a far left input box.

For another example, assuming that when the operation at 302 is implemented and the terminal has already processed some input boxes at the form, the to-be-processed input box is a first input box among input box that have not been processed according to a sequence from top to bottom and from left to right in the same line.

The input boxes that have not been normally processed include, but are not limited to, an input box that does not have input information and an input box that has input information while the input information does not match a corresponding information attribute of the input box.

In the present techniques, according to an application scenario, the server, when generating the form, may preset information attributes corresponding to the input boxes at the form and send the form including the input boxes with information attributes to the terminal so that the terminal may use the information attributes of the input box to conduct a preliminary verification, such as format verification, to the information input into the input box.

For example, if the form is a website registration page and information to be input into a particular input box is a cell phone number of the user, the server may set information attribute of the input box as "11 digit numbers." When the terminal determines that the information input into the input box is not a number, or a number of digits is not 11, the terminal may determine that the input information does not match the information attribute corresponding to the input box and the input box is an input box that has not been normally processed.

The above is an optional method that determines the to-be-processed input box. The present disclosure does not impose any restriction to any other method that determines the to-be-processed input box. For example, a random input box that has not been normally processed may be determined as the to-be-processed input box.

At 304, the terminal moves the form at the touchscreen to coincide an information inputting position at the to-be-processed input box with a position of a cursor at the touchscreen.

Figure 4:
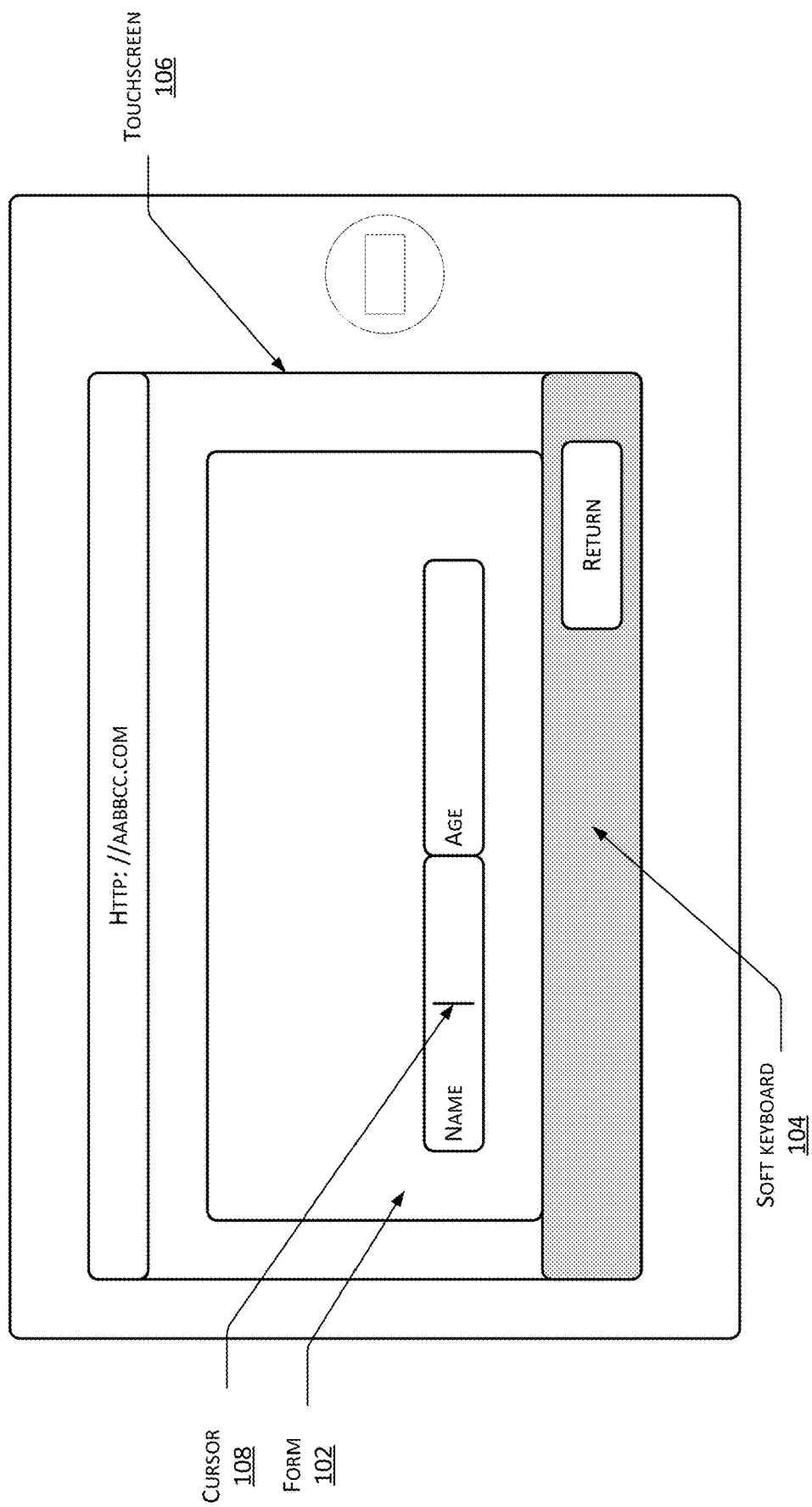
FIGS. 4, 5, and 6 are diagrams illustrating example distances between a cursor and a soft keyboard according to the first example embodiment of the present disclosure.
Figure 5:
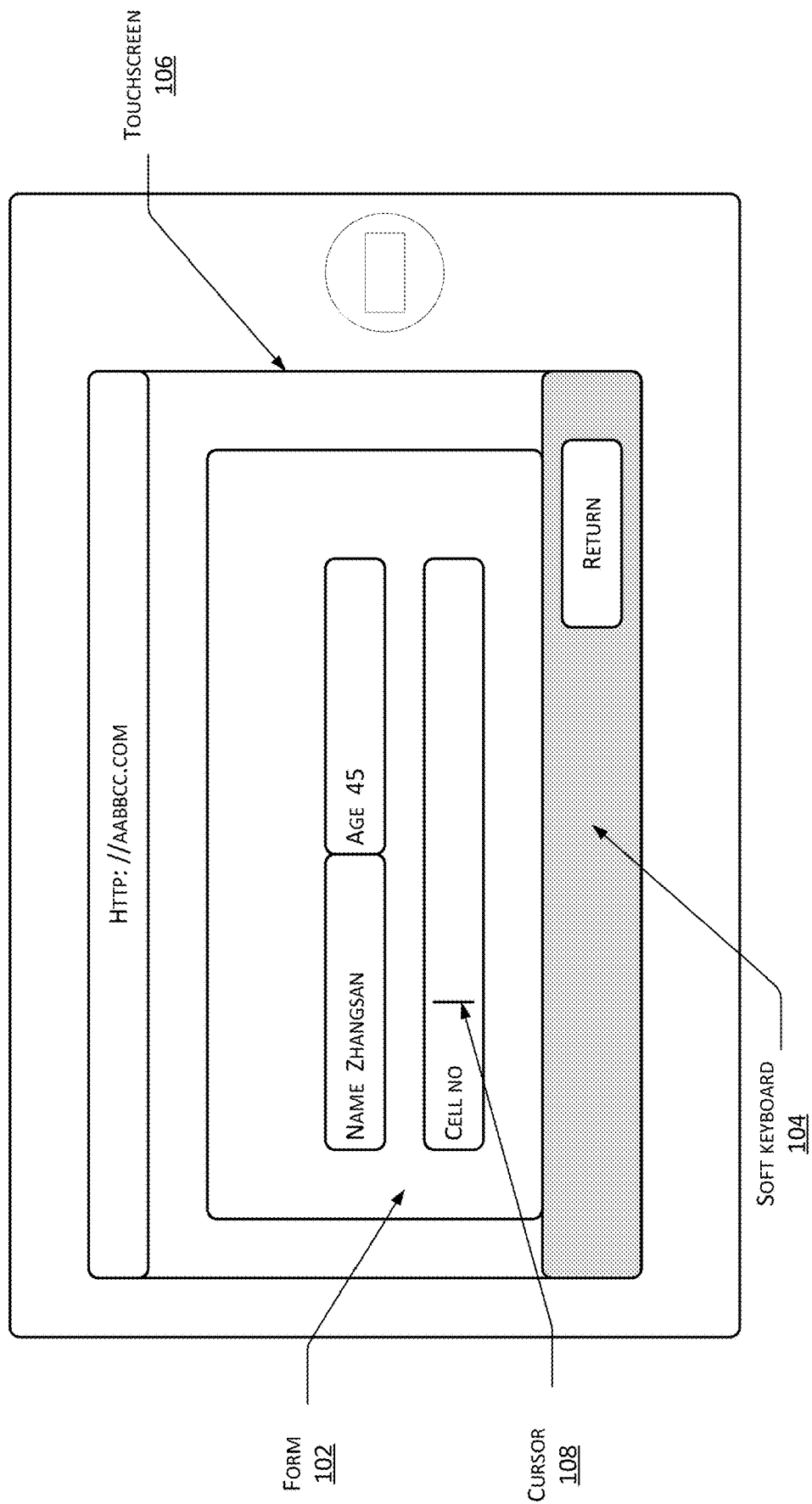

In the present techniques, a fixed location of the cursor at the touchscreen may be preset to facilitate the user to input and fix a focus point of the user, thereby improving an accuracy and speed of filling the form. For example, the fixed position of the cursor at the touchscreen may be a position with a preset distance to the soft keyboard and on top of the soft keyboard. The preset distance may be determined according to a height of the input box, a distance between two adjacent input boxes, etc. For instance, the preset distance may be a distance between two input boxes (as shown in FIGS. 4 and 5) or a sum of the distance between the two input boxes and ⅔ of a height of a next input box.

After the cursor position is fixed, after determining the to-be-processed box each time, the terminal moves the position of the form at the touchscreen so that the information inputting position at the to-be-processed input box coincides with the position of the cursor at the touchscreen.

Figure 6:
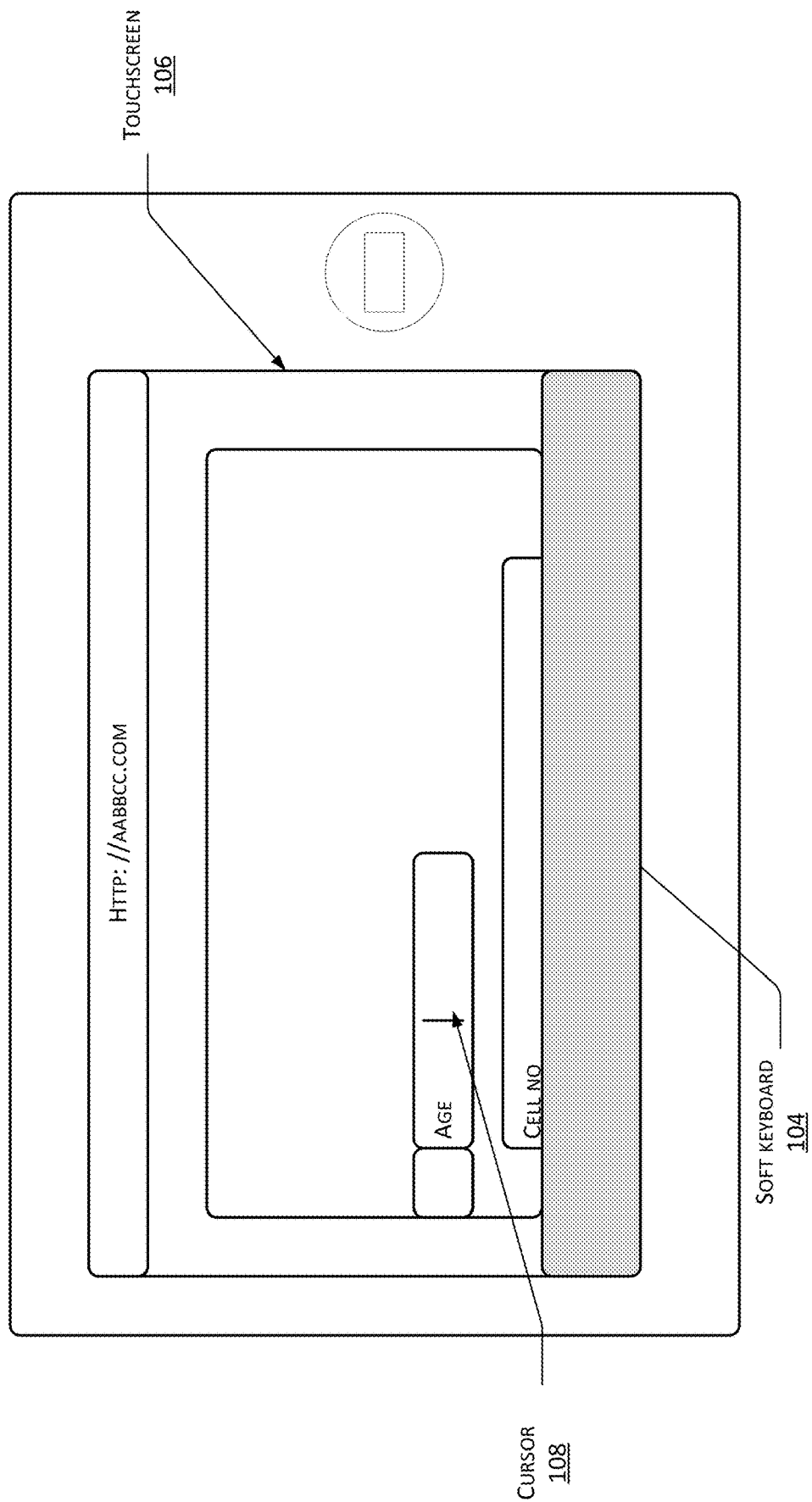

An example method for moving the form by the terminal may be as follows. The terminal determines a displacement vector of the information inputting position at the to-be-processed input box and the position of the cursor at the touchscreen and uses the determined displacement vector to displace the form. In the examples of FIGS. 4 and 6, after the user completing inputting a "name" input box, the terminal determines that the to-be-processed input box is an "age" input box. The terminal further determines a displacement vector between the position of the "age" input box at the screen and the position of the cursor and moves the "age" input box to left according to the displacement vector until reaches a circumstance as shown in FIG. 6 so that the information inputting position at the "age" box coincides with the position of the cursor. (For instance, the "name" input box may be moved out of a range of the touchscreen and cannot be seen at the touchscreen after the "age" input box is moved to the left.)

At 306, the terminal inputs the received information to the to-be-processed input box.

As the information inputting position at the to-be-processed input box coincides with the position of the cursor at the touchscreen, the to-be-processed input box is an input box that the user currently inputs information. Thus, when the terminal receives the information input by the user through a soft keyboard that is displayed to the user at the touchscreen, the terminal inputs the received information to the to-be-processed input box.

For example, if the server presets the information attribute corresponding to the to-be-processed input box, the terminal may further determine whether the input information matches the information attribute of the to-be-processed input box. If the input information matches the information attribute of the to-be-processed input box, subsequent operations are performed. If the input information matches the information attribute of the to-be-processed input box, operations jump to 302. The input box that the input information does not match the information attribute is re-used as the to-be-processed input box. Alternatively, the user is reminded that the input information does not match and requested to re-input information to the to-be-processed input box until the input information matches the corresponding information attribute and then operations at 308 are implemented.

At 308, the terminal determines whether the information has been finished inputting into the to-be-processed input box. If a result is positive, operations at 310 are implemented. Otherwise, the terminal waits until all information has been finished inputting into the to-be-processed input box.

At 308, the terminal may determine whether the information has been finished inputting according to the information attribute of the to-be-processed input box. Alternatively, the terminal may determine whether the information has been finished inputting according to a trigger of the user.

For example, the information attribute of the to-be-processed input box is "11 digit numbers." When the terminal detects that the user has input 11 continuous numbers through the soft keyboard, the terminal determines that the information has been finished inputting into the to-be-processed input box.

For another example, the terminal determines whether the information input by the user through the soft keyboard includes an instruction that indicates that the information has been finished inputting (such as an enter instruction or any other specific instruction).

At 310, the terminal may determine whether there is any other input box that is not normally processed. If a result is positive, operations at 302 are performed. Otherwise, operations at 312 are performed.

Figure 7:
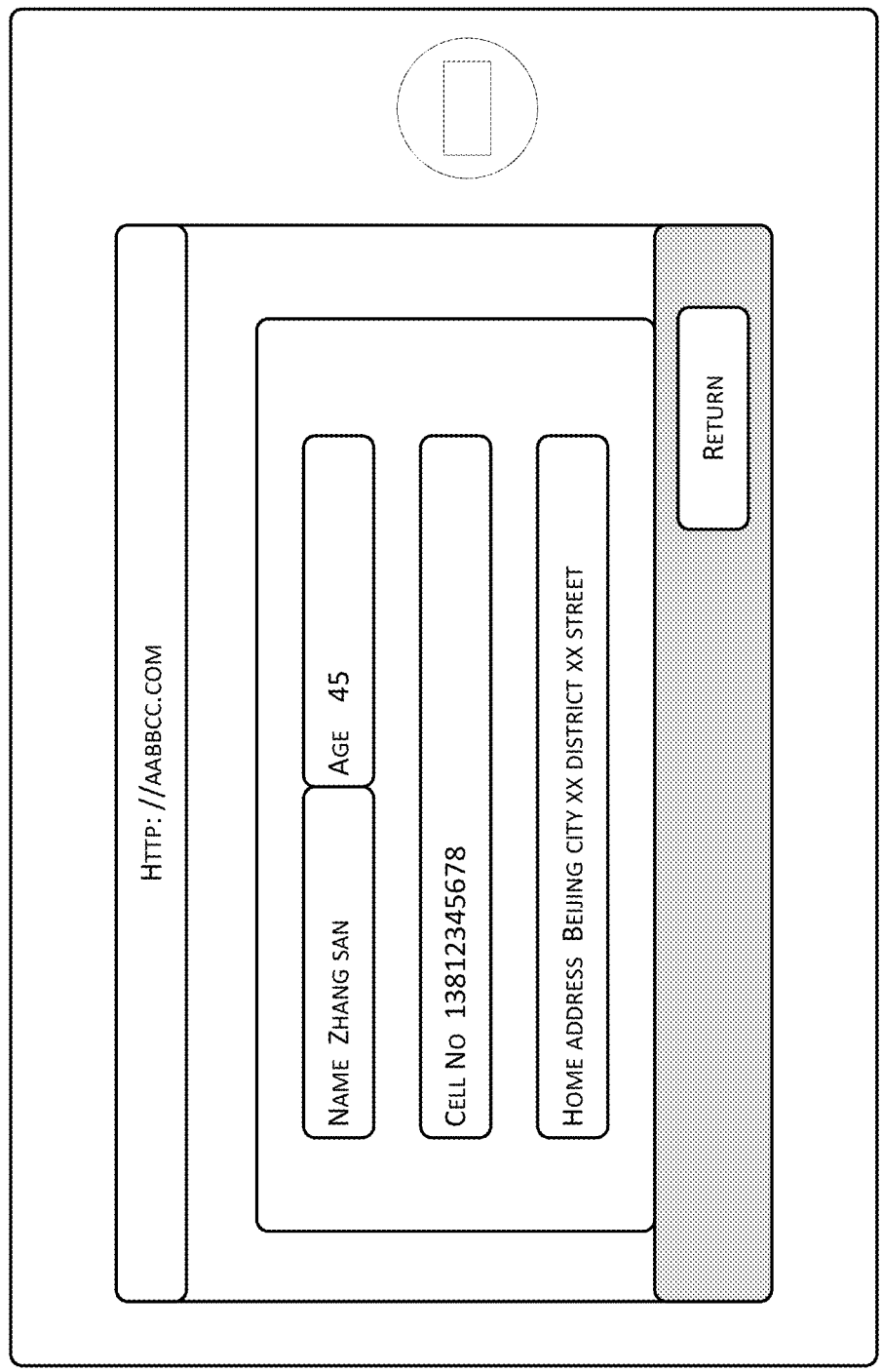
FIG. 7 is a diagram of an example form, into which information has been input into all input boxes, displayed to a user by an example terminal according to the first example embodiment of the present disclosure.

The above operations from 302 to 310 are circular processes. From a first input box at a first line of the form, the operations from 302 to 310 are performed to each input box until all input boxes are processed and the information inputting operations have been conducted to all input boxes of the form. Then the terminal may hide the soft keyboard and display the form that all input boxes have been processed to the user, as shown in FIG. 7. If the user needs to modify the information that has been input into an input box, the user may, according to the conventional techniques, click the input box that needs modifying. The terminal receives the click trigger from the user, moves the form so that the information inputting position at the input box coincides with the position of the cursor at the touchscreen, opens the soft keyboard, and continues to receive the information input by the user to update the information that is already input into the input box that the cursor locates.

At 312, the terminal submits the form in which the input boxes have finished processing to a server. If the server responds a successful message, the processing to the form is completed. Otherwise, operations at 314 are performed.

For example, the terminal may not immediately submit the form that the input boxes have finished processing to the server. Instead, the terminal waits for the user to trigger. When the user clicks a submit button in the form, the terminal receives the trigger that the user submits the form through the touchscreen. Then, the terminal submits the form that has input boxes that have finished processing to the server.

At 314, the terminal receives the form that has incorrect input information returned by the server.

After the server receives the form submitted by the terminal, the server analyzes the information input into each input box of the form. If the information passes the analysis, the server returns the successful message to the terminal and completes the processing of the form this time and does not performed operations at 314 and afterwards. If the information does not pass the analysis, the server determines that some information input into the input boxes of the form is incorrect, the server returns the form to the terminal, informs the terminal of an input box that has incorrect input information, and requests the user to input the correct information.

At 316, the terminal coincides an information inputting position at the input box that has incorrect input information with the position of the cursor at the touchscreen.

At 316, when the terminal receives the form returned by the server, the terminal also obtains an identity of the input box that has the incorrect input information. If there is only one input box that has the incorrect input information, the terminal coincides the information inputting position at the input box with the position of the cursor at the touchscreen. If there are multiple input boxes that have incorrect input information, the terminal may input the information into the input boxes that have incorrect input information in turn according to the operations at 316 and a sequence from top to bottom and from left to right in each line of the form.

At 318, the terminal receives information that the user currently inputs and uses the currently input information as re-input information to update the information of the input box that has incorrect input information.

For example, the user uses the soft keyboard to input information into the terminal. When the terminal receives the information that the user currently inputs, the currently input information is used to update the information that coincides with the position of the cursor or update the information of the input box that has the incorrect information so that the information currently input into the input box passes the analysis of the server.

At 320, the terminal determines whether there is any input box that has incorrect input information and is not processed. If a result is positive, operations at 316 are performed. Otherwise, operations at 312 are performed until the server successfully analyzes the form and completes processing of the form.

Under the present techniques of the first example embodiment, when processing the form, the terminal only assigns computer processes to operations of moving the form. Compared with the conventional techniques of using the cursor to locate the form, the present techniques may reduce the processes required for processing the form and effectively save terminal resources. In addition, the present techniques fix the cursor on top of the soft keyboard and at the position close to the soft keyboard, thereby enabling the user to conveniently input information, fixing the focus point of the user, and improving the accuracy and inputting speed of filling in the form. Furthermore, when the form submitted by the terminal to the server includes the input box that has incorrect input information, the terminal receives the form returned by the server and accurately coincides the input box that has the incorrect input information with the cursor so that the user may conveniently modify the form and the efficiency of filling in the form is improved.

The present disclosure also provides an example terminal with a touchscreen, which belongs to a same inventive concept of the first example embodiment, in accordance with a second example embodiment of the present disclosure.

Figure 8:
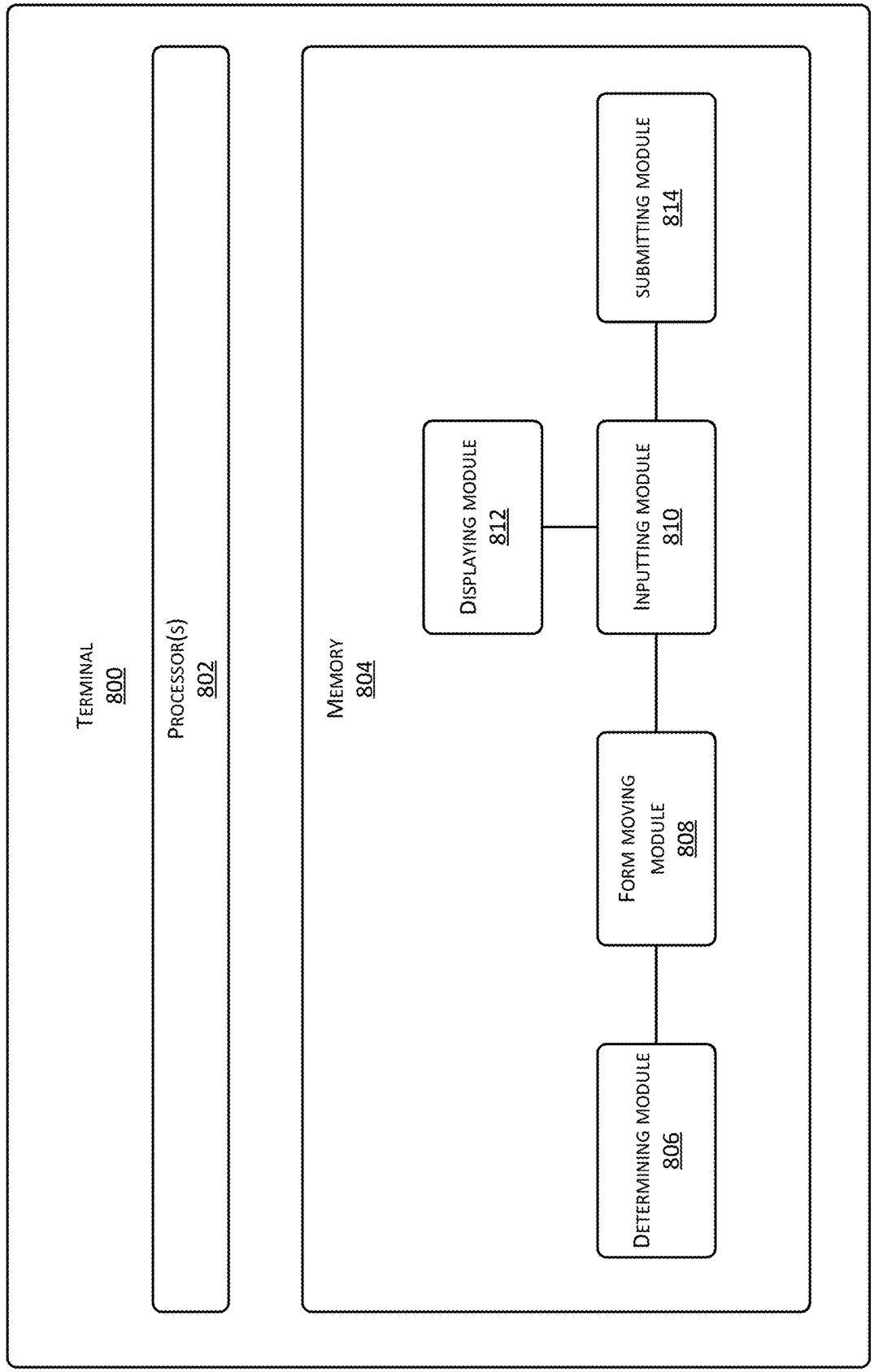
FIG. 8 is a diagram illustrating an example terminal according to a second example embodiment of the present disclosure.

A terminal 800, as shown in FIG. 8, may include one or more processor(s) 802 or data processing unit(s) and memory 804. The memory 804 is an example of computer-readable media. The memory 804 may store therein a plurality of modules including a determining module 806, a form moving module 808, and an inputting module 810.

The determining module 806 determines a to-be-processed input box at a form. The form moving module 808 moves the form at the touchscreen so that an information inputting position at the to-be-processed input box coincides with a position of a cursor at the touchscreen.

The inputting module 810 inputs received information such as information received through a soft keyboard into the to-be-processed input box.

For example, the position of the cursor at the touchscreen is a position with a preset distance to the soft keyboard and on top of the soft keyboard.

For example, the determining module 806 may determine an input box into which information has not been input as the to-be-processed form. The determining module 806 may also determine another input box whose input information does not match corresponding information attribute of the input box as the to-be-processed form. The determining module 806, according to a sequence of determined input boxes in the form, such as from top to bottom and from left to right in a same line, treat the determined input inboxes as the to-be-processed input box one-by-one sequentially.

For example, the terminal may also include a displaying module 812 that, after information inputting operations with respect to all input boxes at the form have been finished, displays the form to the user. The displaying module 812 may communicate with the touchscreen. That is, the terminal presents the form to the user through the touchscreen.

The form moving module 808, when receiving a click or trigger with respect to a particular input box input through the touchscreen, moves the form so that the information inputting position at the input box that the user clicks coincides with the position of the cursor at the touchscreen.

The inputting module 810 uses information input by the user such as those through the soft keyboard to update the information that is already input into the input box where the cursor locates.

For another example, the terminal may also include a submitting module 814 that, after information inputting operations with respect to all input boxes at the form have been finished, submits the form to the server. The submitting module 814 may be regarded as a communication interface that has communication capability with the server. The communication interface not only submits the form at the terminal to the server but also receives the form pushed by the server to the terminal.

The form moving module 808, after the form with incorrect input information returned by the server is received, coincides an information inputting position of an input box where the input information is incorrect with the position of the cursor. The inputting module 810 uses re-input information such as information received through the soft keyboard to update the information that is already input into the input box where the input information is incorrect.

For another example, the terminal 800, in addition to the above modules, may include the touchscreen and the soft keyboard (not shown in FIG. 8). The touchscreen, as a screen of the terminal, presents the page or form to the user and receives a trigger message input by the user when the user touches the touchscreen.

The soft keyboard, presented to the user through the touchscreen, receives the information input by the user when the user clicks the soft keyboard as in inputting interface.

The terminal 800 of the present disclosure may also have general network communication capability and interactive capability with the user as a normal terminal, which are not detailed herein for the purpose of brevity.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The present techniques are described by reference to the flowcharts or diagrams of the methods, devices (systems), or computer software products. It should be understood that the computer-executable instructions may implement each process or box in the flowcharts and/or diagrams, and a combination of processes and/or boxes in the flowcharts and/or diagrams. The computer-executable instructions may be provided to one or more processors at a general-purpose computer, a special-purpose computer, an embedded computer, or any other programmable data processing device to generate a machine, through which the computer-executable instructions executed by the processors of the computer or any other programmable data processing process implements the designated functionalities of one or more processes at the flowcharts and/or one or more boxes at the diagrams.

The computer-executable instructions may be stored at one or more computer-readable media that leads the computer or any other programmable data processing device to work in specific methods so that the computer-executable instruction stored at the computer-readable media produce a product that includes an instruction apparatus. The instruction apparatus implements the designated functionalities of one or more processes at the flowcharts and/or one or more boxes at the diagrams.

The computer-executable instructions may also be loaded at the computer or any other programmable data processing device so that the computer or any other programmable data processing devices performs a series of operations to produce processes implemented by the computer. Thus, the computer-executable instructions executable by the computer or any other programmable device provide operations to implement the designated functionalities of one or more processes at the flowcharts and/or one or more boxes of the diagrams.

In a standard configuration, a computing device as described in the present disclosure may include one or more central processing units (CPU), input/output interfaces, and memory. The memory may include forms such as non-permanent memory, random access memory (RAM), and/or non-volatile memory such as read only memory (ROM) and flash random access memory (flash RAM) in the computer-readable media. The memory is an example of computer-readable media. The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

Although the present disclosure describes the example embodiments, one of ordinary skill in the art could make changes and modifications to the example embodiments once he/she know those basic creative concepts as described herein. Thus, the appended claims shall be construed to cover the example embodiments and all changes and modifications that fall into the scope of the present disclosure.

Furthermore, one of ordinary skill in the art may make any revisions or variations to the present techniques without departing the spirit and scope of the present techniques. Thus, in case such revisions or variations fall under the scope of the claims of the present techniques and its equivalent techniques, the present disclosure also intends to cover such revisions or variations.

What is claimed is:

1. A method comprising:
    determining a plurality of to-be-processed input boxes among a plurality of input boxes of a form, the to-be-processed input boxes being determined based on each input box not having information input and based on information input into each input box having information input;
    moving the form at a touchscreen to coincide an information inputting position at a to-be-processed input box among the plurality of to-be-processed input boxes with a position of a cursor at the touchscreen;
    receiving information input into the to-be-processed input box;
    determining whether any other input box of the form is not normally processed; and
    upon determining an input box of the form that is not normally processed, repeating each above step.

2. The method of claim 1, wherein the information is received through a soft keyboard.

3. The method of claim 2, further comprising fixing the position of the cursor at the touchscreen.

4. The method of claim 3, wherein the position of the cursor has a preset distance to the soft keyboard and on top of the soft keyboard.

5. The method of claim 1, wherein determining a to-be-processed input box at the form comprises determining an input box into which information has not been input as the to-be-processed input box.

6. The method of claim 1, wherein determining a to-be-processed input box at the form comprises determining an input box whose input information does not match a corresponding information attribute of the input box as the to-be-processed input box.

7. The method of claim 1, wherein determining a to-be-processed input box comprises determining the to-be-processed input box from one or more input boxes at the form according to a sequence from top to bottom and from left to right in a same line of the form.

8. The method of claim 1, further comprising:
displaying the form to a user;
receiving a trigger of a particular input box that is input through the touchscreen;
moving the form at the touchscreen to coincide an information inputting position at the particular input box with the position of the cursor at the touchscreen;
receiving information re-input by the user; and
using the re-input information to update the information that is already input into the particular input box.

9. The method of claim 1, further comprising:
submitting the form to a server;
receiving the from returned by the server after at least one input box of the form is determined to include incorrect input information;
moving the form at the touchscreen to coincide an information inputting position of a particular input box that has the incorrect input information with the position of the cursor at the touchscreen;
receiving re-input information; and
using the re-input information to update the incorrect input information that is already input into the particular input box.

10. A terminal comprising:
one or more processors; and
one or more computer-readable media having stored thereon computer-executable modules executable by the one or more processors that, when executed by the one or more processors, perform associated operations, the computer-executable modules comprising:
a determining module configured to determine a plurality of to-be-processed input boxes among a plurality of input boxes of a form, the plurality of to-be-processed input boxes being determined based on each input box not having information input and based on information input into each input box having information input;
a form moving module configured to move the form at a touchscreen to coincide an information inputting position at a to-be-processed input box among the plurality of to-be-processed input boxes with a position of a cursor at the touchscreen; and
an inputting module configured to receive information input into the to-be-processed input box;
wherein the determining module is further configured to determine whether any input box of the form other than the to-be-processed input box is not normally processed, and, upon determining an input box of the form that is not normally processed, causing the determining module, the form moving module, and the inputting module to respectively repeat each above operation.

11. The terminal of claim 10, wherein the inputting module is configured to receive information through a soft keyboard.

12. The terminal of claim 11, wherein the form moving module is configured to fix the position of the cursor at the touchscreen.

13. The terminal of claim 12, wherein the position has a preset distance to the soft keyboard and on top of the soft keyboard.

14. The terminal of claim 10, wherein the determining module is configured to determine an input box into which information has not been input as the to-be-processed input box.

15. The terminal of claim 10, wherein the determining module is configured to determine an input box whose input information does not match a corresponding information attribute of the input box as the to-be-processed input box.

16. The terminal of claim 10, wherein the determining module is configured to determine the to-be-processed input box from one or more input boxes at the form according to a sequence from top to bottom and from left to right in a same line of the form.

17. The terminal of claim 10, further comprising:
a displaying module configured to display the form to a user; and
wherein the form moving module is further configured to, after receiving a trigger of a particular input box that is input through the touchscreen, move the form at the touchscreen to coincide an information inputting position at the particular input box with the position of the cursor at the touchscreen; and
the inputting module is further configured to, after receiving information re-input by the user, use the re-input information to update the information that is already input into the particular input box.

18. The terminal of claim 10, further comprising:
a submitting module configured to submit the form to a server;
wherein the form moving module is further configured to, after receiving the from returned by the server after at least one input box of the form is determined to include incorrect input information, move the form at the touchscreen to coincide an information inputting position of a particular input box that has the incorrect input information with the position of the cursor at the touchscreen; and
the inputting module is further configured to, after receiving re-input information, use the re-input information to update the incorrect input information that is already input into the particular input box.

19. One or more computer-readable media stored thereon computer-executable instructions executable by one or more processors to perform operations comprising:
determining a plurality of to-be-processed input boxes among a plurality of input boxes of a form, the to-be-processed input boxes being determined based on each input box not having information input and based on information input into each input box having information input;
moving the form at a touchscreen to coincide an information inputting position at a to-be-processed input box among the plurality of to-be-processed input boxes with a position of a cursor at the touchscreen;
receiving information input into the to-be-processed input box;
determining whether any other input box of the form is not normally processed; and
upon determining an input box of the form that is not normally processed, repeating each above step.

20. The one or more computer-readable media of claim 19, wherein the information is received through a soft keyboard.

* * * * *